(No Model.)  2 Sheets—Sheet 1.
F. H. RICHARDS.
AUTOMATIC WEIGHING MACHINE.
No. 535,727. Patented Mar. 12, 1895.
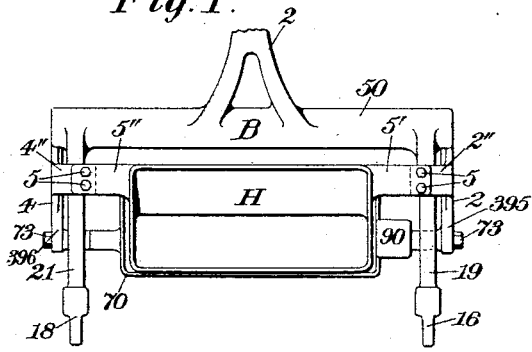
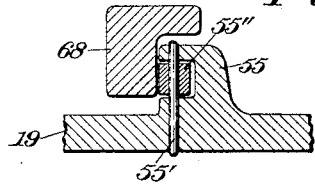
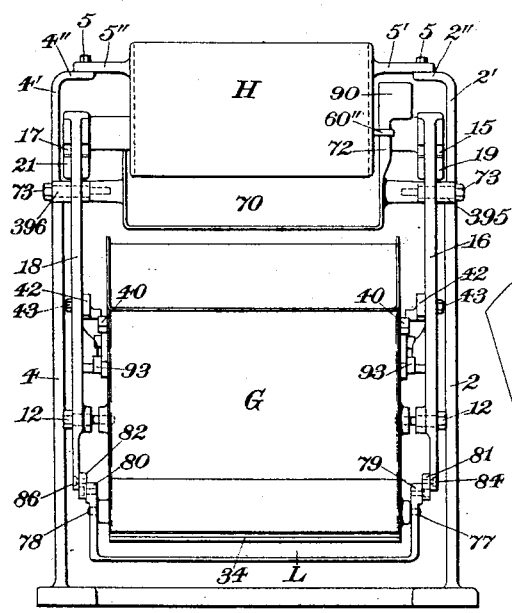
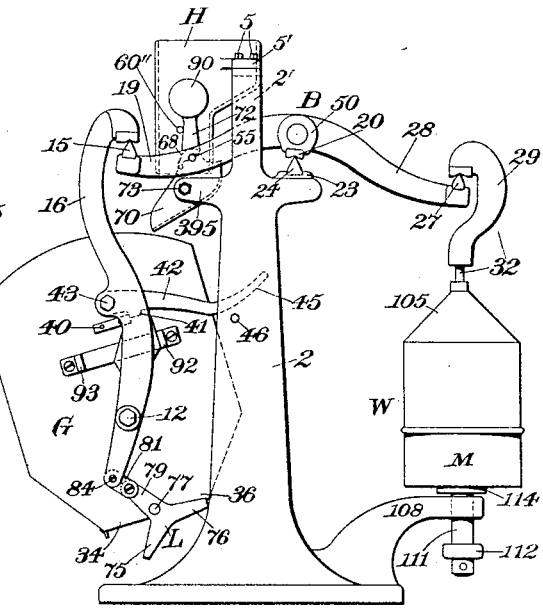
Witnesses:
J. L. Edwards Jr.
Fred. J. Dole.
Inventor:
F. H. Richards (No Model.) 2 Sheets—Sheet 2.

F. H. RICHARDS.
AUTOMATIC WEIGHING MACHINE.

No. 535,727. Patented Mar. 12, 1895.

Witnesses:
J. L. Edwards Jr.
Fred. J. Dole.

Inventor:
F. H. Richards

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 535,727, dated March 12, 1895.

Application filed July 14, 1894. Serial No. 517,551. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to automatic weighing-machines, and has for its object to furnish a weighing-machine having an improved valve-mechanism, whereby the machine may be adapted for weighing granular materials of irregular size, and especially for weighing the smaller classes of anthracite coal and such materials as meal, feed, cement and others, the particles of which are normally of relatively small size, but which in practice are of a more or less lumpy character or are mixed with pieces or masses of relatively large size, and which are therefore liable to clog the valves ordinarily used upon weighing machines.

For the purpose of illustrating the nature and mode of operation of my present improvements I have shown the same applied to a double-bucket weighing machine, the principal features of which are shown and described in prior Letters Patent of the United States granted to myself and others; which well known features are for convenience herein briefly described.

Figure 4:
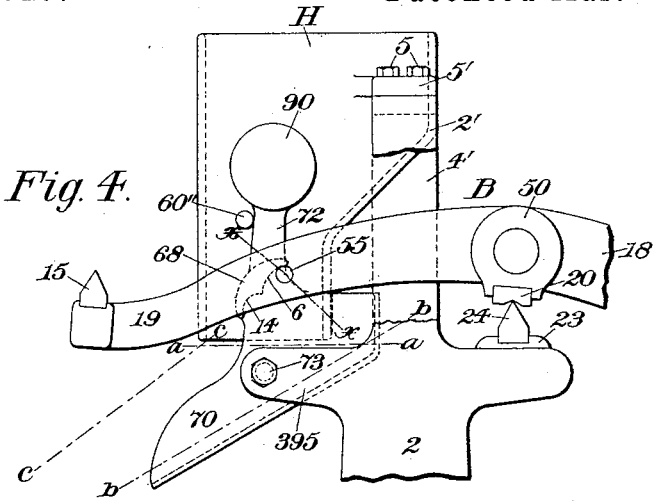
Figure 5:
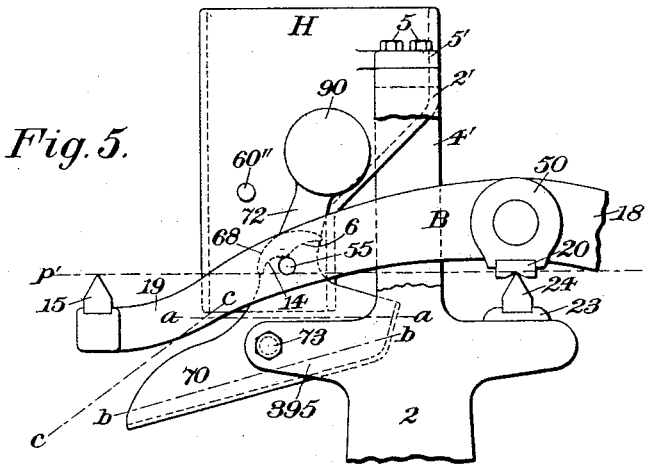
Figure 6:
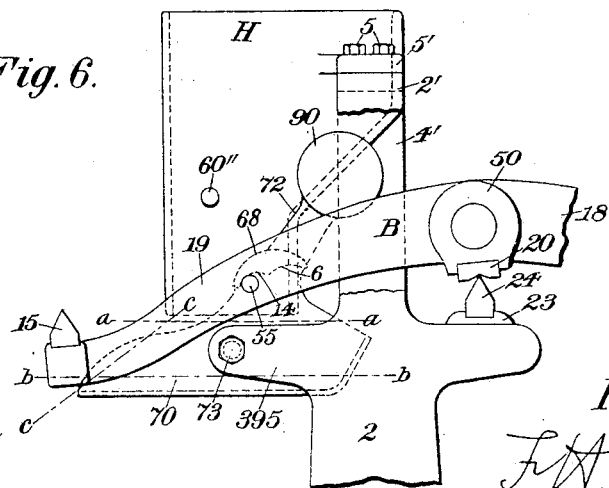

In the drawings accompanying and forming a part of this specification Figure 1 is a plan view of the upper front portion of an automatic weighing-machine embodying my present improvements. Fig. 2 is a front elevation of the weighing-machine. Fig. 3 is a side elevation of the same, as seen from the right hand in Fig. 2. Figs. 4, 5 and 6 are enlarged sectional, side elevations of the valve mechanism and adjacent parts, and illustrate the operation of said valve-mechanism by showing the parts thereof in successive stages of their operation. Fig. 7 is an enlarged sectional detail taken in line $x$—$x$, Fig. 4.

Similar characters designate like parts in all of the figures.

The framework for carrying the operative parts of this machine usually, and as shown in the drawings, comprises two side-frames or uprights 2 and 4, having vertical extensions 2' and 4', upon which the supply-chute H, is secured by means of bolts 5 passing through the projecting arms 5' and 5'', extending from said chute, and through the lateral arms or brackets 2'' and 4'' of the side frames.

The double-chambered bucket G is journaled at 12 in bearings formed in the hangers 16 and 18, which are suspended by V-shaped bearings on the pivots or knife-edges 15 and 17, respectively, of the principal arms 19 and 21 of the scale-beam B. It will be understood that when reference is made herein to the movement of said scale-beam, the movement of these bucket-supporting arms is meant, this coinciding, of course, with that of the bucket itself.

The beam B has V-shaped bearings, one at each end of the hollow shaft 50, thereof, only one of said bearings 20 being shown. Said bearings rest on pivots or knife-edges suitably supported, as by bearings on the framework. One of said knife-edges is shown at 24, and its bearing at 23.

Opposite to arms 19 and 21 an arm 28 extends rearwardly from the scale-beam-shaft 50, and is provided with a pivot or knife-edge 27 on which a main weight, such as W, (also designated as the "counter-weight") is suspended by a hook 29. This counter-weight is preferably made up of a lower main-weight M, which should have a mass sufficient to balance the unloaded bucket, and a cylindrical cover 105, fitted to slide up and down on a suspension-rod 32 and containing suitable load-weights adapted to bring up the weight of the counterpoise to the weight of the load of coal or other material carried by the bucket. The construction and mode of operation of this counterpoise-weight are fully set forth in my prior Letters Patent No. 442,720, granted December 16, 1890, to which reference may be had for a more particular description thereof. The stop shown herein, however, for limiting the vertical movements of the counterweight, is of a simple type, comprising preferably an upper stop-face 114, and a lower stop-collar 112, mounted upon the rod 111, which extends through an opening in the bracket 108.

The bucket G, of the double-chambered type and having the discharge spouts 34 and 36, is journaled at 12 as before stated, and the oscillation of said bucket is limited by suitable stops on each side thereof of any of the well known kinds, the pair on the right being designated 92 and 93, respectively. The spouts 34 and 36 are alternately closed by a bucket-closer, such as L, which is pivotally supported upon said bucket and is operated by a suitable connection with the hangers thereof. The form of closer herein shown consists of the two oppositely-disposed plates or closers proper 75 and 76, pivoted to the bucket G upon each side, at 77 and 78, respectively.

To the upper ends of the arms 79 and 80 are pivoted the ends of links 81 and 82, the opposite ends of which are pivoted at 84 and 86 to the lower ends of the hangers 16 and 18.

The construction and mode of operation of this form of bucket-closer are more fully shown and described in detail in my prior Letters Patent, No. 442,713, granted December 16, 1890, to which reference may be had.

For retaining the bucket in its forward and backward positions, respectively, I preferably employ the bucket-latch described in my prior Letters Patent, No. 447,354, granted March 3, 1891, but in connection with fixed stops upon the side-frames.

The detent apparatus is shown in the drawings as comprising the bucket-latches or levers 42, which are pivoted at 43 to the hangers 16 and 18, and the projecting ends 45 of which engage with the fixed stops 46 upon the side-frames. The arms 42 carry suitable detent-catches 41, adapted to engage with stops 40, which are secured to the side of the bucket in the usual manner. The rearward ends 45 of the levers 42, are preferably of segmental form, being substantially concentric with the bucket-supporting knife-edges, when the beam is at the poising point.

The valve-mechanism, for reducing and for cutting off the flow of the material to the bucket, is actuated partly from and by the scale-beam and partly by the force of the supply-stream, and said mechanism will now be described.

In weighing machines as heretofore constructed it has been the practice to control the shutting-off of the supply-stream by means of at least two valves, usually successively operated, that is to say, by means of a reducing valve that gradually cut down the volume of the flow to a drip-stream of any predetermined size, and by the subsequent action of a cut-off valve, the movement of which followed, either immediately or after a predetermined interval, the movement of the reducing valve and served to shut off the stream entirely. By means of my present improvements, however, I am enabled to combine in one valve 70 the functions of both the reducing valve and the cut-off valve heretofore constructed as independent but co-operating elements of the valve mechanism of weighing-machines, and not only thereby to simplify the construction and operation of the valve mechanism, but also to obtain from the combination of the two functions, and by reason of the peculiar manner in which it becomes necessary to hang the valve, a third function not inherent in or obtainable from either a reducing valve or a cut-off valve as ordinarily constructed, or from the combined action of the two separating devices.

In the drawings I have shown the valve 70 as pivoted at 73 within the arms or brackets 395 and 396, formed upon the side frames 2 and 4. A stop, such as 60", is provided to limit the movement of the valve when open. The valve-actuating lever is shown at 72, and is preferably provided with a weight 90, in substantially the well known manner. A cam, such as 68, is also provided for controlling the movements of the valve and is formed with two cam-faces 6 and 14, the former of which is so shaped that, when engaged by the actuator 55, mounted upon the scale-beam, it will offer no lateral or vertical resistance to the movement of the scale-beam in downward direction as the weight of the valve becomes effectual to neutralize said resistance. In order to avoid unnecessary friction upon the moving parts, I have shown the actuator 55 as provided with a bearing for a spindle or pin 55', carrying a friction-roller 55", which travels upon the cam-faces. The center of gravity of the valve and its actuating lever is slightly to the rear of the pivot or axis 73 of the valve movement, so that when the actuator 55 begins its downward movement, the bucket being then sufficiently loaded to cause the descent of the scale-beam from the position shown in Fig. 4, the weight of said lever will cause the valve to oscillate upon its axis and gradually reduce the flow of the stream by the riding of the actuator down the incline of the cam-face 6, until the beam has reached the poising line P', in Fig. 5, and the actuator is at the end of the cam-face 6 and ready to enter the lower cam-face 14 as soon as the beam becomes overpoised. By this first movement of the scale-beam, that is, its poising movement, the valve 70 has been oscillated upon its axis until the front end thereof has been thrown forward along the line of the supply chute and nearer to the line of the normal angle of repose of the material issuing from the spout or chute, which line in the case of some materials will coincide substantially with the dotted line c—c, Figs. 4, 5 and 6. As here shown this line is assumed to be that of the normal angle of repose of wheat. As soon as the beam becomes sufficiently overpoised to descend to the position shown in Fig. 6 the actuator 55 will ride down into the lower cam-face 14, and the weight of the valve-lever will then tend to carry the rear end of the valve farther down and bring the blade or bottom-plate of the valve into a horizontal position, at the same time carrying the forward end thereof farther toward and then beyond the line c—c of the angle of repose of the material, thus cutting off the supply entirely. It will be seen that during the descent of the beam the valve forms a chute for the supply-stream, and that, at the end of the movement thereof, said valve forms a support for the mass of material cut off thereby. In addition, however, to reducing and shutting off the flow of the stream by projecting the front end of the valve toward and beyond said line of the angle of repose of the outflowing material, an additional means for checking and stopping said flow is obtained by the oscillation of the valve upon its axis, and the consequent shifting of the positions of the various particles or masses of material between the lower edge of the chute and the blade or bottom plate of said valve, and thereby—of course, the vertical shifting of the flow-line of the stream with respect to the line of the normal angle of repose of the material. The force of said shifting movement is not noticeably exerted upon the stream or mass contained within the walls of the lower portion of the chute; nor is it appreciable in the lower stratum or layer of material lying immediately upon the bottom of the valve; but in the zone between the lines $a$—$a$ and $b$—$b$, Figs. 4, 5 and 6, the shifting of said particles or masses is most marked, and the effect of said shifting movement constitutes a most important feature of my invention and a means for controlling the flow of the supply-stream, which means, is auxiliary to the control of the flow by the forward movement of the valve. The resultant effect is a constantly increasing variable one, tending to constantly reduce the volume of the flow-stream, and in an increasing ratio, small at first, but rapidly increasing during the early part of the overpoise period of movement of the scale beam; and finally operating to cut off the flow entirely, before the actual close of the valve by the actuator.

It will be seen that the axis of the valve movement is a fixed line with respect to the mass of material supported upon the valve and that as the valve itself rotates about said axis, that portion of the sustained stream will have a shifting movement with respect to said axis, and with respect also to the mouth of the chute and the blade or bottom plate of the valve. Each grain or piece of that portion of the sustained stream will tend to rotate or oscillate upon an arc of a circle struck from the axis of the valve, and the farther the distance of the particle from said axis the greater will be the arc of movement of said piece or grain, the particles of the mass nearest the extreme front and rear ends of the valve having, of course, the greatest vertical movement. The shifting particles to the rear of the valve-axis have a descending movement during the fall of the scale-beam, and consequently the mass behind said axis is correspondingly loosened up during the closing movement of the valve; while those particles of the mass forward of said axis rise during the closing of the valve, and tend to bank up upon the forward portion of the valve-bottom or pan and between it and the lower edge of the supply-chute, the oscillation of the valve under pressure of the sustained column, tending to force the grains, or pieces of the material, back into the chute and over the center of the axis of the valve movement. The greater part of the weight of the sustained column, therefore shifts to the rear of the valve, and serves to act as an additional force upon the rear of the said valve to aid the weighted actuating lever in closing the same. This effect is very marked when the axis of the valve is forward of the center of the supply chute. A most important result, however, of the rotary shifting of the particles of the column sustained between the valve-bottom and the mouth of the supply-chute is to force said pieces or grains upward and backward, away from the forward end or mouth of the valve and thereby cut off the flow of the stream entirely, before the front end of the valve reaches the line of the normal angle of repose of the material issuing from the chute. It will therefore be evident that the shutting off of the flow is not a true "cut-off" of the stream, in the sense in which this term has been usually understood when applied to automatic weighing machines, but that such shut-off of the flow, in advance of the actual arrival of the front edge of the valve at the line of such angle of repose, is due mainly to the lateral, rearward, shifting, movement of the mass sustained upon the forward portion of the valve. This non-progressive movement is due partly to the bodily shifting of the mass sustained upon the bottom of the valve, with respect to the line of the normal angle of repose; and partly to the forcing of such mass backward, away from said line, by the combined, upward movement of the forward portion of the valve and the mass thereon, and the downward movement of the stream contained in and issuing from the chute. The opposition of these two forces tends to produce a lateral displacement of the mass at the meeting point of the forces, and said lateral displacement will of course occur principally in the direction of the least resistance. In this case there is a great resistance at the front end of the valve, due to the rising thereof and banking of the material thereon; while there is very little resistance at the rear of the valve, owing to the descent thereof. Moreover, there is a natural flow or current from the chute to the rear of the valve when said rear portion descends, and hence there is a further tendency for the granular material forward of the valve axis to shift to the rear and move with the current of grain flowing onto the rear end of the valve from the chute. As will be seen from Figs. 4 and 5, the force tending to carry the particles sustained upon the front end of the valve toward the rear of said valve is a gradually decreasing one from said front end, where the arc of movement is greatest and the tendency to compression of the particles correspondingly great. Said force of compression decreases, owing to the shortening of the successive arcs of movement of successive points of the valve, until the axial center of the valve is reached, when said force disappears; and from this point to the extreme rear of the valve there is a gradually-increasing force of dispersion, or separation of the particles sustained.

It will be seen from the above that the resistance opposed to the rearward movement of the sustained column is also a variable one, which constantly decreases from the front to the rear of the valve; and that, therefore, a path of movement being thus provided for the banked-up mass on the front of the valve-pan, the particles of said mass will tend to move toward the rear of said valve, and will follow said path of gradually-decreasing resistance and will moreover have their movements accelerated by the current setting in toward the rear of the valve from the chute; whereby, as fast as the mass accumulates upon the front end of the valve it will tend to move to the rear, and thereby attain the result intended to be secured by the construction and organization of the valve-mechanism described; viz., to entirely cut off the flow of the stream before the front end of the valve meets the line of the normal angle of repose of the material issuing from the spout, and therefore in advance of a cut-off effected by means of a valve the path of movement of which is in a line substantially parallel with its ultimate cut-off position.

From Figs. 5 and 6 it will be evident that the upward and rearward shiftings of the mass upon the forward end of the valve is greatest from the poising position of the beam and valve mechanism to the overpoise position shown in Fig. 6, as during said period the position of the bottom of the valve with respect to a horizontal line gradually changes, until the angle of inclination reaches zero. As, during this period, the position of the front end of the valve quite rapidly changes and approaches the line of the angle of repose a correspondingly increasing force is applied to sustain the forward half or portion of the column of material and carry it toward the rear of the valve, thereby assuring a correspondingly early final cut-off movement of the valve.

It will be observed that the front and rear portions of the valve, in all positions thereof, extend beyond the walls of the mouth of the supply-chute. While this feature of construction is not necessarily an important one, so far as the front portion of said valve is concerned, it is a very essential element as applied to the rear portion of said valve; as otherwise, a portion of the supply stream would tend to flow from the rear of the valve, and thus impair the accuracy and proper operation of the machine.

By means of the peculiar described construction of the valve and the peculiar organization of the same with the spout of chute, and with the valve operating means, said valve is readily operated by a relatively small amount of power, in proportion to the size of the valve and the volume of the stream of material to be controlled thereby; so that by means of my present improvements it is practicable to employ a relatively large chute, controlled by a single relatively large valve performing the functions of both reducing the stream and shutting it off entirely, in connection with a relatively small weighing machine. Moreover, by this construction and organization it is not necessary that the grains or pieces of material being weighed should be absolutely or even relatively uniform in size, as there is no delicate mechanism to be clogged; and lumpy and irregular materials of different kinds, such as those hereinbefore specified, may be weighed with facility and precision, and in relatively small quantities, results which are of great practical value in the art.

Having thus described my invention, I claim—

1. In an automatic weighing-machine, the combination with a supply-chute, and with a scale-beam; of a valve underlying said supply-chute and in operative relation with said scale-beam, said valve being adapted to form alternately a chute and a support for the supply-stream, and having its axis of movement passing through that portion of said supply-stream which is sustained by the valve, and also having an arc of movement, at each side of its axial center, adapted to cause a vertical shifting of the flow-line of the stream with respect to the line of its normal angle of repose, whereby a corresponding regulation of the volume of the flow is obtained, and said movement also being adapted to cause an opposite vertical shifting of the material supported upon said valve in the rear of said axis, substantially as and for the purposes set forth.

2. In an automatic weighing-machine, the combination with a supply-chute, and with a scale-beam, of a valve underlying said supply-chute and in operative relation with said scale-beam said valve being adapted to form alternately a chute and a support for the supply-stream and having its axis of movement passing through that portion of said supply-stream which is sustained by the valve and also having an arc of movement adapted to cause a lateral shifting of the flow-line of the stream with respect to the line of its normal angle of repose whereby during the closing of the valve a rearward shifting movement of the sustained mass with respect to the line of repose is obtained and a corresponding regulation of the volume of the flow, substantially as and for the purposes set forth.

3. In an automatic weighing-machine, the combination with a supply-chute, and with a scale-beam; of a valve underlying said supply-chute and in operative relation with said scale-beam, said valve being adapted to form alternately a chute and a support for the supply-stream, and having its axis of movement passing through that portion of said supply-stream which is sustained by the valve, and also having an arc of movement, at each side of its axial center, adapted to cause a vertical and a lateral shifting of the flow-line of the stream with respect to the line of its normal angle of repose, whereby during the closing of the valve a vertical rearward shifting movement of the sustained mass with respect to the line of repose is obtained and a corresponding regulation of the volume of the flow, and said movement also being adapted to cause an opposite vertical shifting of the material supported upon said valve in the rear of said axis, substantially as and for the purpose set forth.

4. In an automatic weighing-machine, the combination with a supply-chute, of a scale-beam, an actuator controlled by said scale-beam, a valve underlying said supply-chute and having its axis of movement passing through that portion of the mass which is sustained by the valve, and a cam upon said valve and controlled by the actuator and adapted to cause the oscillation of said valve, whereby upon the descent of the scale-beam opposite non-progressive shifting movements are imparted to said mass at opposite sides of said axis and the cut-off of the flow is effected prior to the actual closure of the valve, substantially as and for the purposes set forth.

5. In an automatic weighing-machine, the combination with a supply-chute, of a scale-beam, an actuator controlled by said scale-beam, a valve underlying said supply-chute and having its axis of movement passing through that portion of the mass which is sustained by the valve, and a cam upon said valve and controlled by the actuator and adapted to cause the oscillation of said valve, whereby upon the descent of the scale-beam opposite non-progressive shifting movements are imparted to said mass at opposite sides of said axis and the reduction of the volume of the stream is correspondingly accelerated and the final cut-off of the flow is effected prior to the actual closure of the valve, substantially as and for the purposes set forth.

FRANCIS H. RICHARDS.

Witnesses:
FRED. J. DOLE,
EMMA G. FOWLER.